United States Patent
Gupta et al.

(10) Patent No.: US 9,671,992 B2
(45) Date of Patent: Jun. 6, 2017

(54) FLEXIBLE DISPLAY DEVICE MONITORING SYSTEM

(71) Applicant: Dell Products L.P., Round Rock, TX (US)

(72) Inventors: Chitrak Gupta, Karnataka (IN); Alonzo Fleming Seay, Austin, TX (US); Deeder Aurongzeb, Austin, TX (US); Sushma Basavarajaiah, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/742,325

(22) Filed: Jun. 17, 2015

(65) Prior Publication Data

US 2016/0371043 A1    Dec. 22, 2016

(51) Int. Cl.
*G06F 3/14*        (2006.01)
*G06F 3/16*        (2006.01)
*G06F 3/01*        (2006.01)

(52) U.S. Cl.
CPC ............. *G06F 3/14* (2013.01); *G06F 3/016* (2013.01); *G06F 3/16* (2013.01)

(58) Field of Classification Search
CPC . G06F 1/1652; G06F 3/01; G06F 3/03; G06F 2203/04102; H04M 1/0268
See application file for complete search history.

(56) References Cited

U.S. PATENT DOCUMENTS

| | | | |
|---|---|---|---|
| 3,040,583 A | 6/1962 | Post | |
| 3,350,944 A | 11/1967 | DeMichele | |
| 8,564,573 B2 | 10/2013 | Prat et al. | |
| 8,587,542 B2 | 11/2013 | Moore | |
| 2014/0049463 A1* | 2/2014 | Seo | G06F 3/0487 345/156 |
| 2015/0316958 A1* | 11/2015 | Takesue | G06F 3/044 345/173 |

OTHER PUBLICATIONS

Seiichi Takamatsu, Tomoyuki Takahata, Masato Muraki, Eiji Iwase; Kiyoshi Matsumoto and Isao Shimoyama, "Transparent Conductive-Polymer Strain Sensors for Touch Input Sheets of Flexible Displays;" 2015; 2 Pages; Journal of Micromechanics and Microengineering; vol. 20; No. 7; IOP Publishing; http://iopscience.iop.org/0960-1317/20/7/075017.

* cited by examiner

*Primary Examiner* — Hongmin Fan
(74) *Attorney, Agent, or Firm* — Haynes and Boone, LLP

(57) ABSTRACT

A flexible display device monitoring system includes a display layer that is configured to flex into a plurality of flexed orientations. A sensor layer is coupled to the display layer and is configured to flex with the display layer into the plurality of flexed orientations. The sensor layer includes a plurality of sensors that each generate stress data in response to the sensor layer being flexed. A stress monitoring engine is coupled to the sensor layer and receives the stress data from the plurality of sensors when the sensor layer is flexed. The stress monitoring engine determines that the stress data exceeds a stress threshold and, in response, activates an alert system that may provide a vibration alert, a sound alert, or a visual alert. Visual alerts may include activating a relative portion on the display layer that corresponds to sensors that provided sensor data that exceeded the stress threshold.

14 Claims, 17 Drawing Sheets

FIG. 2b

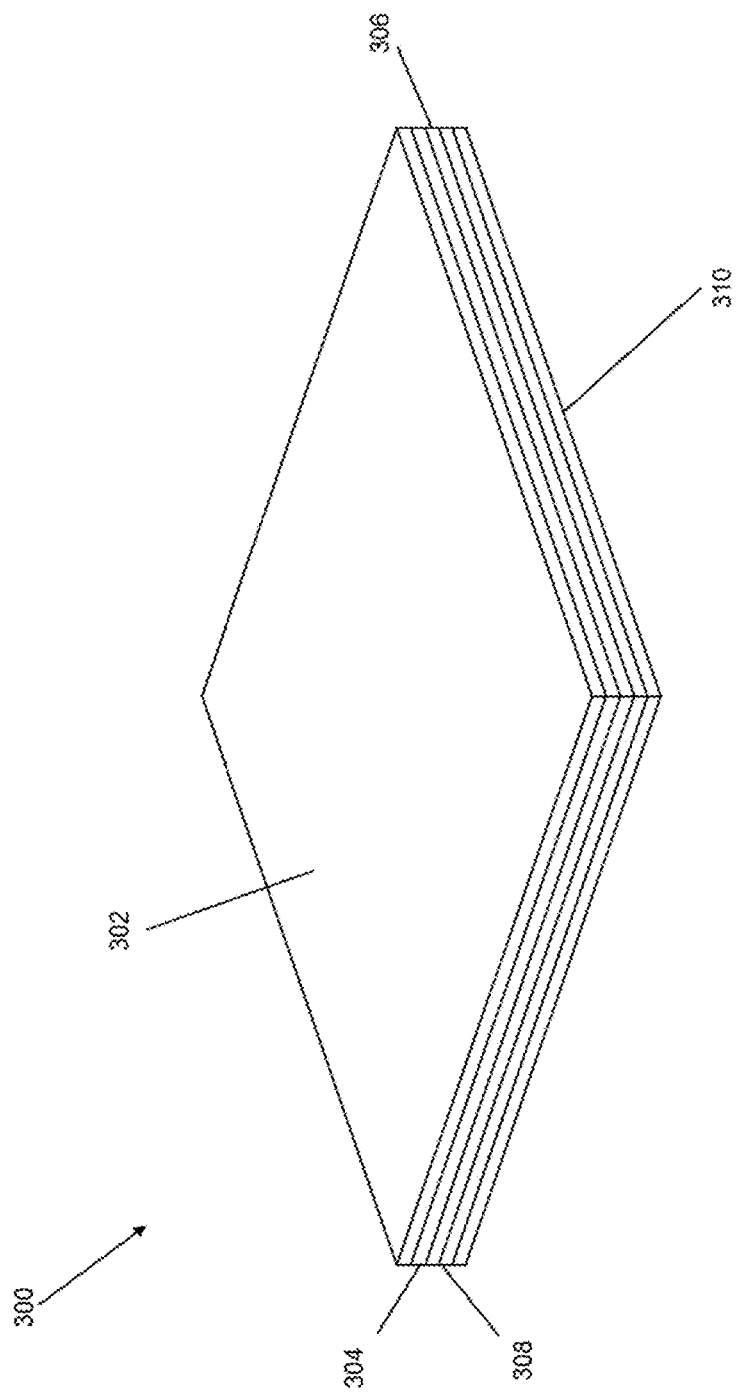

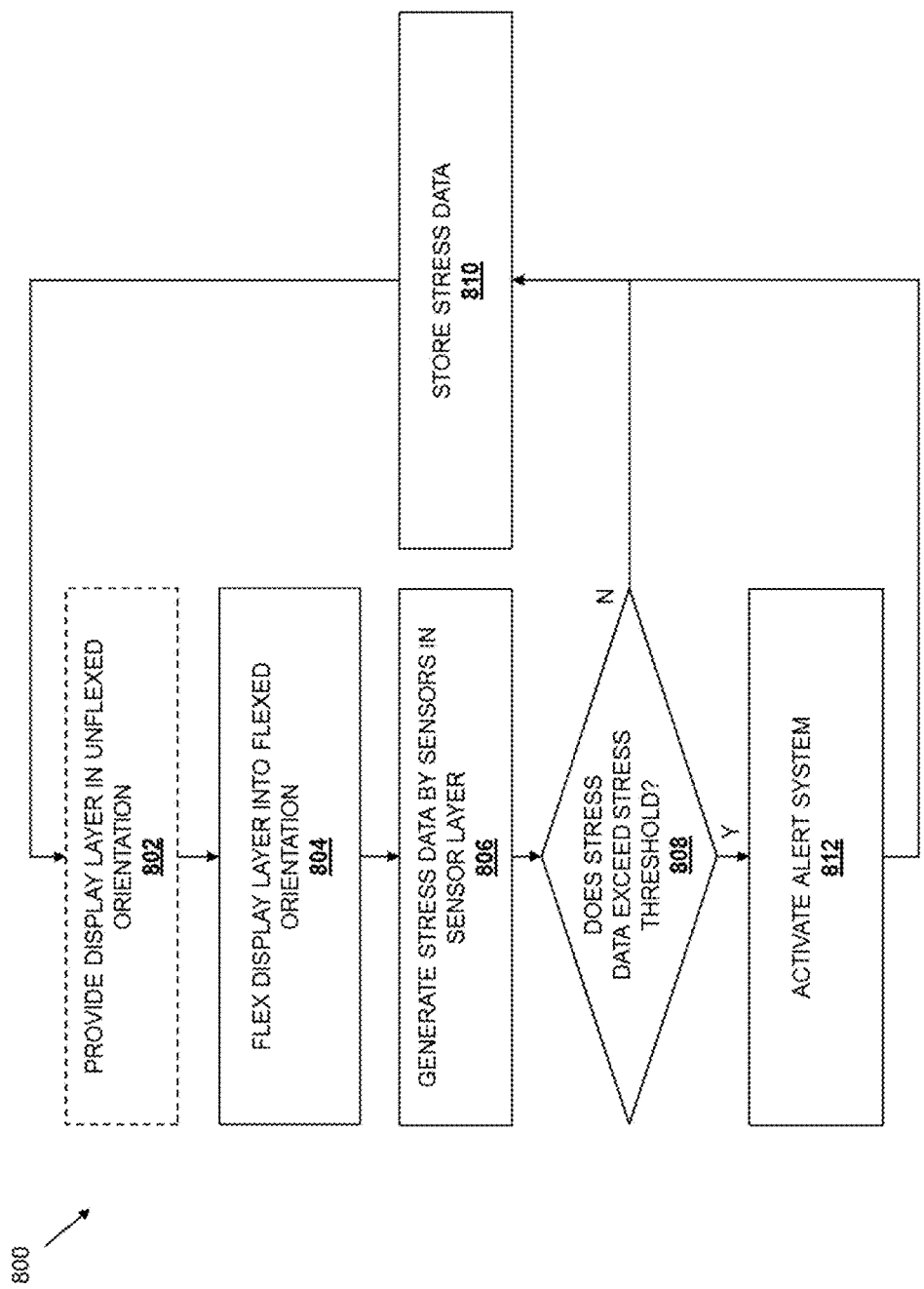

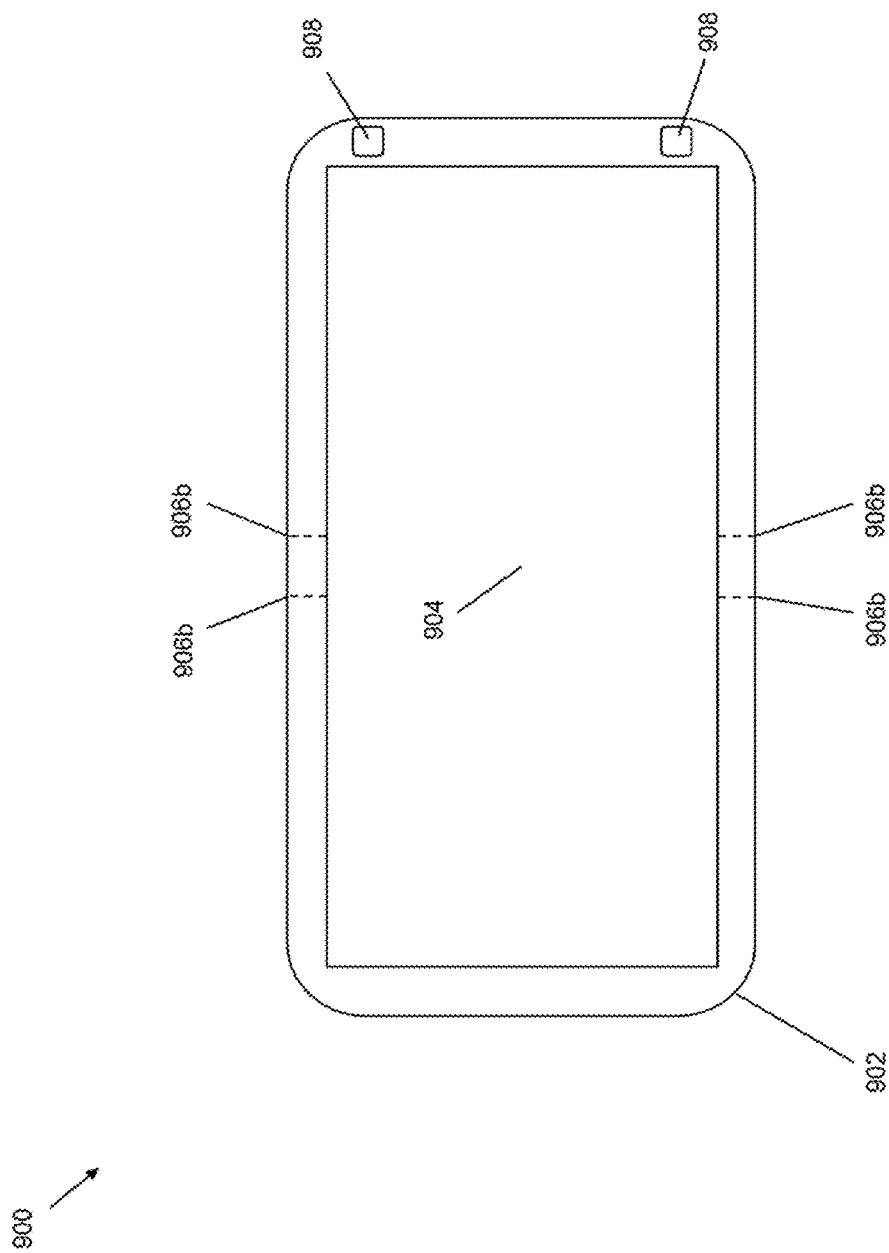

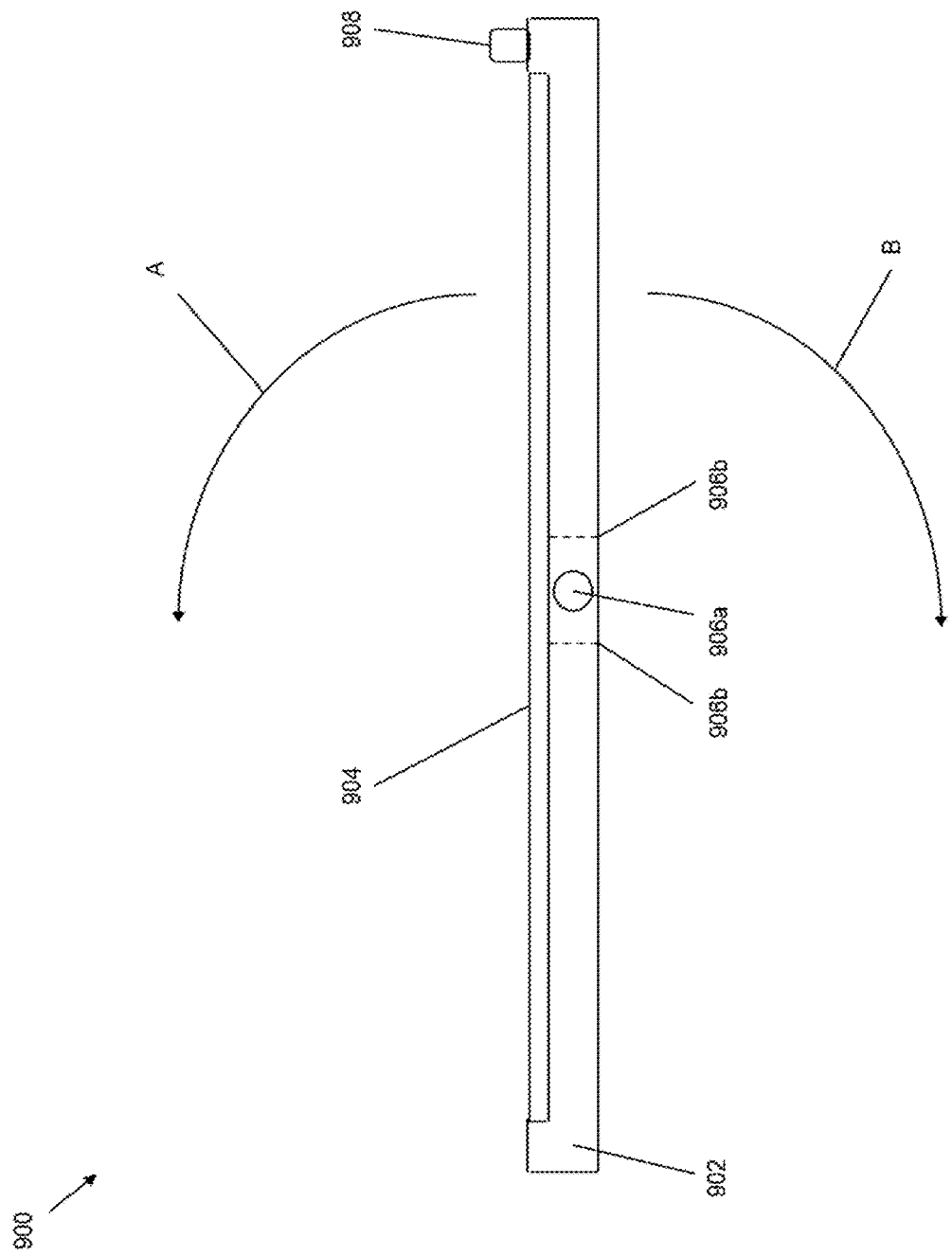

| | STRESS DATA COLUMN 1 | STRESS DATA COLUMN 2 | STRESS DATA COLUMN N | ROW SUM | ROW THRESHOLD |
|---|---|---|---|---|---|
| STRESS DATA ROW 1 | 0.2 | 0.7 | 0.1 | 1.0 | 0.5-1.5 |
| STRESS DATA ROW 2 | 0.3 | 0.8 | 0 | 1.1 | 1.0-2.5 |
| STRESS DATA ROW N | 0.2 | 0 | 0 | 0.2 | 1.5-3.5 |
| COLUMN SUM | 0.7 | 1.5 | 0.1 | | |
| COLUMN THRESHOLD | 0.5-1.5 | 1.0-2.5 | 1.5-3.5 | | |

STRESS DATABASE 208

|  | STRESS DATA COLUMN 1 | STRESS DATA COLUMN 2 | STRESS DATA COLUMN N | ROW SUM | ROW THRESHOLD |
|---|---|---|---|---|---|
| STRESS DATA ROW 1 | 0.8 | 0.7 | 1.0 | 2.5 | 0.5-1.5 |
| STRESS DATA ROW 2 | 0.7 | 0.8 | 1.0 | 2.5 | 1.0-2.5 |
| STRESS DATA ROW N | 0.5 | 1.0 | 1.0 | 2.5 | 1.5-3.5 |
| COLUMN SUM | 2.0 | 2.5 | 3.0 | | |
| COLUMN THRESHOLD | 0.5-1.5 | 1.0-2.5 | 1.5-3.5 | | |

STRESS DATABASE 208

FIG. 12a

FLEXIBLE DISPLAY DEVICE MONITORING SYSTEM

BACKGROUND

The present disclosure relates generally to information handling systems, and more particularly to monitoring system for flexible display devices used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include display devices that are utilized for displaying information received or generated by the information handling system. Such display devices may be subject to stresses due to flexing, bending, or other distortions of the shape of the display device. In some embodiments, flexible display devices such as, for example, Organic Light Emitting Diode (OLED) display devices, utilize thin flexible sheets of organic electroluminescent materials that allow the flexible display device to be flexed, bent, or even folded in half (e.g., folded about its center along the length or width of the flexible display device) while still maintaining the ability to display images received by or generated by an information handling system. However, there may be limits in the amount of flexing or bending a flexible display device can withstand without resulting in damage to the flexible display device. For example, while flexible display devices may flex or bend easily about their center, flexing or bending along an edge of the flexible display device may introduce stresses that can damage the flexible display device. Given the ability the flex or bend the flexible display device about its center, users may not be aware of the flexing or bending limitations of the flexible display device at its edges (or other locations on the flexible display device), and thus may mistakenly flex or bend the flexible display device in a manner that damages the flexible display device without knowledge that such damage was a possibility.

Accordingly, it would be desirable to provide an improved flexible display device system.

SUMMARY

According to one embodiment, an information handling system (IHS) includes a display device that is configured to flex into a plurality of flexed orientations and that includes a plurality of sensors that are each configured to generate stress data in response to the display device being flexed; a processing system that is coupled to the display device; and a memory system that is coupled to the processing system and that includes instructions that, when executed by the processing system, cause the processing system to provide a stress monitoring engine that is configured to: receive stress data from the plurality of sensors; determine that the stress data exceeds at least one stress threshold; and activate an alert system in response to the stress data exceeding the at least one stress threshold.

BRIEF DESCRIPTION OF THE DRAWINGS

FIG. 2b is a schematic view illustrating an embodiment of a stress database in the flexible display device monitoring system of FIG. 2a.

FIG. 3 is a perspective view of a portion of a display layer in the flexible display device monitoring system of FIG. 2.

FIG. 8 is a flow chart illustrating an embodiment of a method for monitoring a flexible display device.

FIG. 9a is a top view illustrating an embodiment of a flexible display device monitoring system with the display device in an unflexed orientation.

FIG. 9b is a side view illustrating an embodiment of the flexible display device monitoring system of FIG. 9a with the display device in an unflexed orientation.

FIG. 11a is a schematic view illustrating an embodiment of stress data provided in a stress database in response to the flexing of a display device.

FIG. 11b is a perspective view illustrating an embodiment of a display layer and a sensor layer in a display device being flexed to generate the stress data of FIG. 11a.

FIG. 12a is a schematic view illustrating an embodiment of stress data provided in a stress database in response to the flexing of a display device.

FIG. 12b is a perspective view illustrating an embodiment of a display layer and a sensor layer in a display device being flexed to generate the stress data of FIG. 12a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
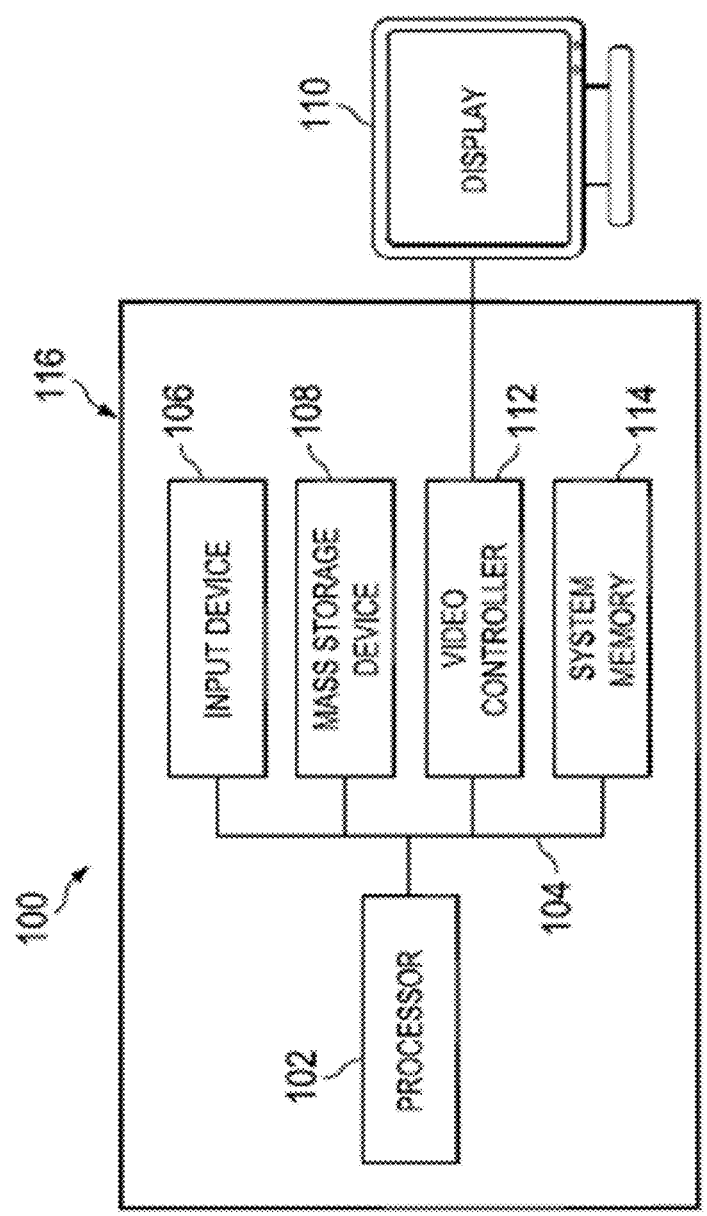
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
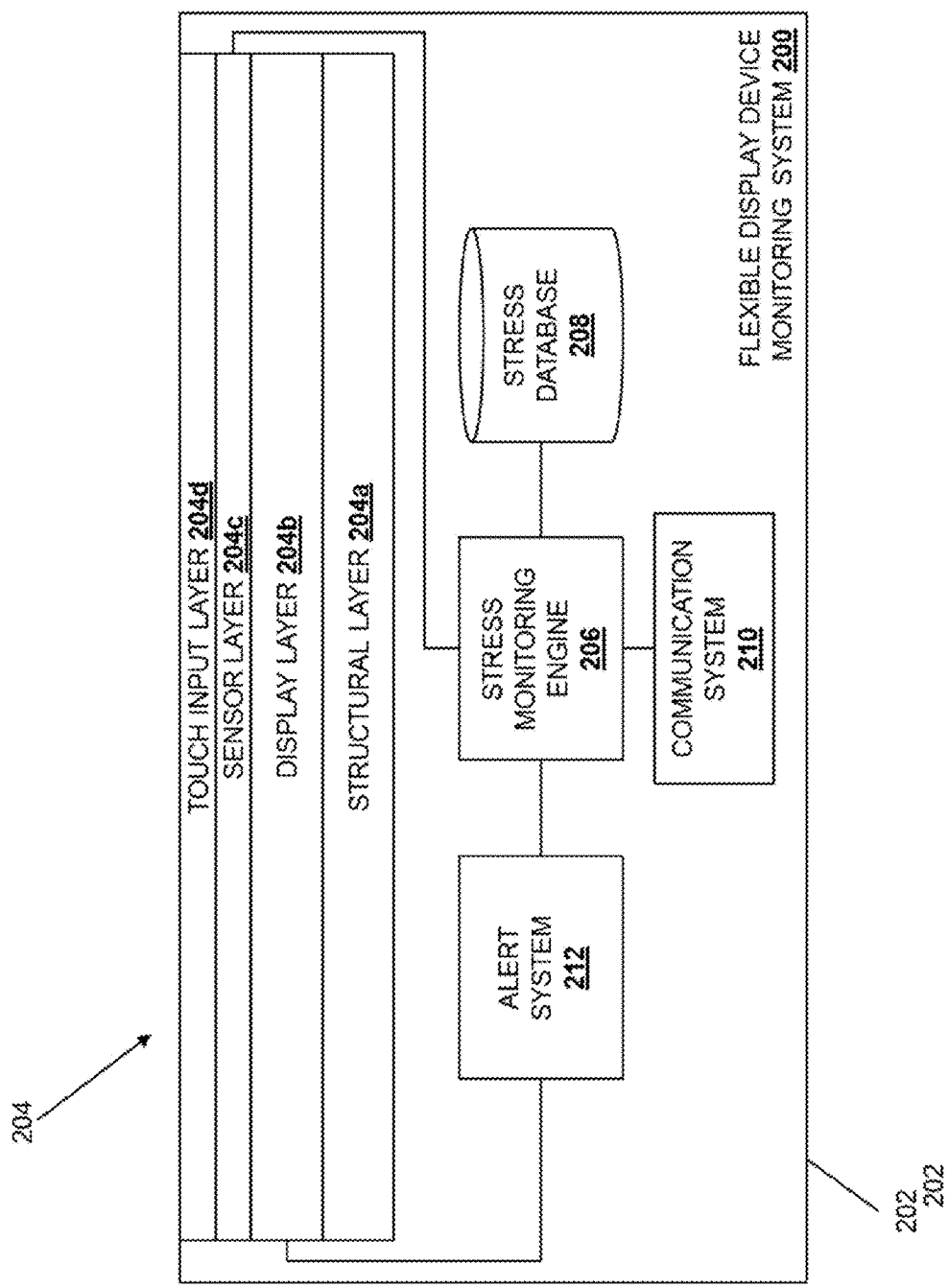
FIG. 2a is a schematic view illustrating an embodiment of a flexible display device monitoring system.

Referring now to FIG. 2a, an embodiment of a flexible display device monitoring system 200 is illustrated. In an embodiment, the flexible display device monitoring system 200 may be the IHS 100 discussed above with reference to FIG. 1, and/or may include some or all of the components of the IHS 100. For example, the flexible display monitoring system 200 may be a tablet computer, a mobile phone, a laptop/notebook computer, a television, and/or a variety of other computing devices known in the art. The flexible display device monitoring system 200 includes a chassis 202, which may be the chassis 116 discussed above with reference to FIG. 1, that houses the components of the flexible display device monitoring system 200. In the illustrated embodiment, the chassis 202 houses a display device 204 that includes a structural layer 204a, a display layer 204b, a sensor layer 204c, and a touch input layer 204d. In the embodiment illustrated in FIG. 2, the display layer 204b engages the structural layer 204a, the sensor layer 204c engages the display layer 204b, and the touch input layer 204d engages the sensor layer 204c. However, as discussed below, other configurations of the layers of the display device 204 will fall within the scope of the present disclosure. In an embodiment, the structural layer 204a may include a variety of structural components that may be selected to allow the display device 204 to be flexed into a plurality of desired flexed orientations. In an embodiment, the touch input layer 204d may include a variety of touch input components that allow a user to provide touch inputs to the flexible display device monitoring system 200. While the touch layer 204d is illustrated and described below, it may be omitted in devices in which touch input functionality is not desired while remaining within the scope of the present disclosure. The display layer 204b and the sensor layer 204c are discussed in further detail below.

The chassis 202 may also house a processing system (not illustrated, but which may be the processor 102 discussed above with reference to FIG. 1) and a memory system (not illustrated, but which may be the system memory 114 discussed above with reference to FIG. 1) that includes instruction that, when executed by the processing system, cause the processing system to provide a stress monitoring engine 206 that is configured to perform the functions of the stress monitoring engines and flexible display device monitoring systems discussed below. The stress monitoring engine 206 is coupled to the sensor layer 204c (e.g., by one or more couplings between the processing system and sensors in the sensor layer 204c, discussed below). The chassis 202 may also house a storage system (not illustrated, but which may be the storage device 118 discussed above with reference to FIG. 1) that is coupled to the stress monitoring engine 206 (e.g., by a coupling between the processing system and the storage system) and that includes a stress database 208 that is configured to store the stress thresholds, alert instructions, and/or any other data utilized by the stress monitoring engine 206. The chassis 202 may also house a communication system 210 that is coupled to the stress monitoring engine 206 (e.g., by a coupling between the processing system and the communication system 210) and that may include a network interface controller (NIC), a wireless communication device (e.g., a WiFi communication system, a Bluetooth communication system, a Near Field Communication (NFC) communication system, etc.), and/or a variety of other communication systems known in the art.

Figure 2B:
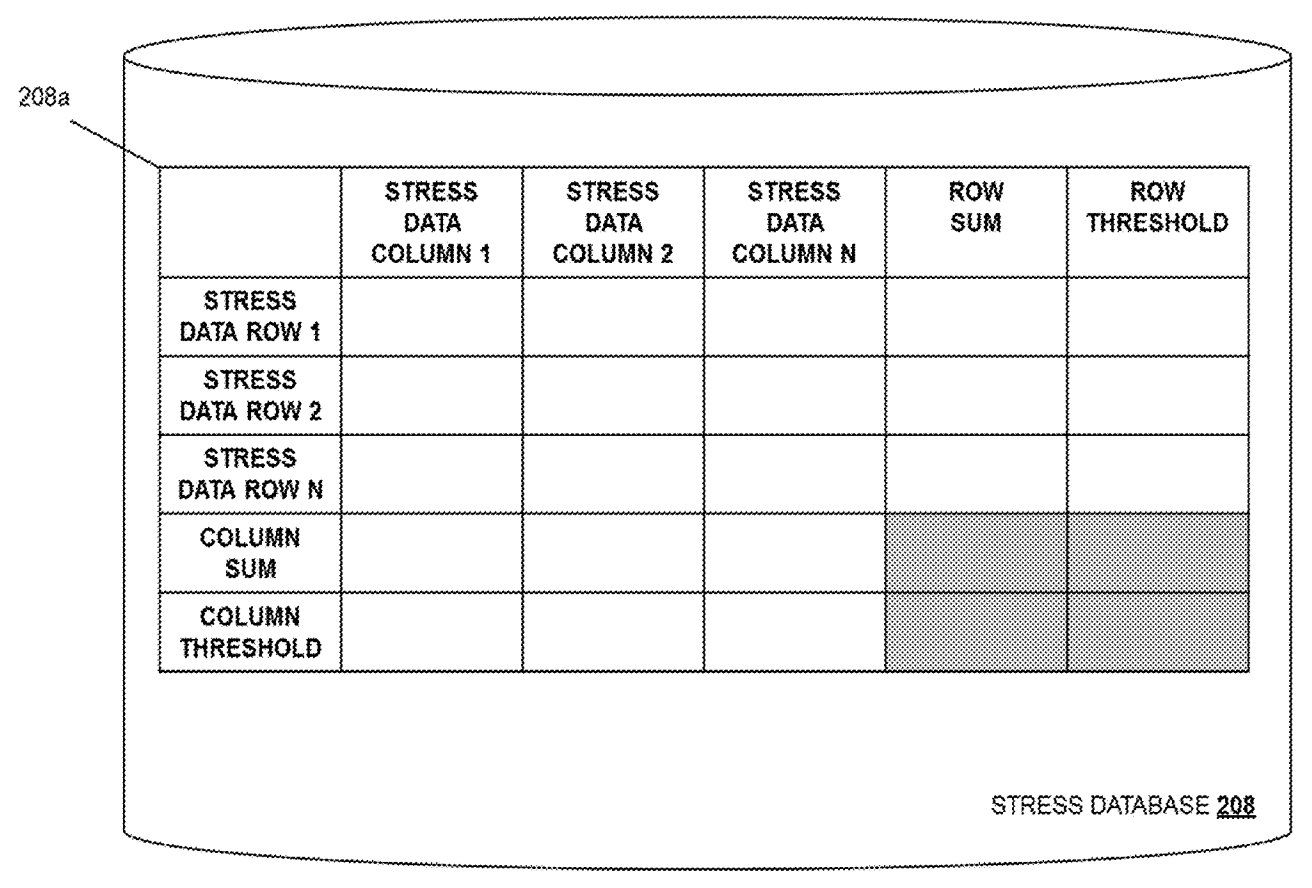

Referring now to FIG. 2b, an embodiment of a stress database 208 is illustrated in more detail. In the illustrated embodiment, the stress database 208 includes a stress calculation matrix 208a having a first stress data column ("STRESS DATA COLUMN 1"), a second stress data column ("STRESS DATA COLUMN 2"), and up to an Nth stress data column ("STRESS DATA COLUMN N"), along with a column for summing the stress data in each row ("ROW SUM") and a column that includes a stress threshold value for the each row ("ROW THRESHOLD"). In the illustrated embodiment, the stress calculation matrix 208a also includes a first stress data row ("STRESS DATA ROW 1"), a second stress data row ("STRESS DATA ROW 2"), and up to an Nth stress data row ("STRESS DATA ROW N"), along with a row for summing the stress data in each column ("COLUMN SUM") and a row that includes a stress threshold value for the each column ("COLUMN THRESHOLD"). As discussed in further detail below, each entry in the stress calculation matrix 208a at a particular stress data row and column (e.g., the entry at STRESS DATA ROW 1 and STRESS DATA COLUMN 1, or at any other intersection of the stress data rows 1-N and stress data columns 1-N) may be provided for stress data from a particular sensor in the sensor layer 204c. Each of those entries may be associated with a threshold stress at which a reading from the associated sensor may be used to provide an alert, discussed in further detail below. In addition, each of the entries in the ROW THRESHOLD and the COLUMN THRESHOLD may include a threshold stress or stress range, and the summation of the readings from sensors in an associated row or column (as determined in the ROW SUM and COLUMN SUM), respectively, may be used to activate an alert, discussed in further detail below. While a specific example of the stress calculation matrix 208a in the stress database 208 has been provided, one of skill in the art in possession of the present disclosure will recognize that the stresses discussed below may be determined to exceed stress thresholds in a variety of manners other than via the stress calculation matrix 208a illustrated in FIG. 2b while remaining within the scope of the present disclosure.

The chassis 202 may also house an alert system 212 that is coupled to the stress monitoring engine 206 (e.g., by a coupling between the processing system and the alert system 212) and that may include any of the variety of alert systems discussed below. For example, in the illustrated embodiment, the alert system 212 is illustrated as coupled to the display layer 204b, and in such an example the alert system 212 may be a video driver or application that is configured to utilize the display layer 204b to provide a visual alert. However, in other example, other devices such as Light Emitting Devices (LEDs) may be coupled to the alert system 212 to provide visual alerts. In another example, the alert system 212 may include a vibration producing device and corresponding actuator for actuating the vibration producing device in order to provide a vibration alert. In another example, the alert system 212 may include an audio speaker and corresponding drive for driving the audio speaker to provide a sound alert. While several examples have been provided above and are discussed below, one of skill in the art in possession of the present disclosure will recognize that the alert system 212 may utilize a wide variety of other alert components known in the art while remaining within the scope of the present disclosure.

Referring now to FIG. 3, an embodiment of a display layer 300 is illustrated that may be the display layer 204b discussed above with reference to FIG. 2. In an embodiment, the display layer 300 may be an Organic Light Emitting Diode (OLED) display layer that utilizes thin flexible sheets of organic electroluminescent materials. For example, in the illustrated embodiment, the display layer 300 includes an anode layer 302, a conductive layer 304 engaging the anode layer 302, an emissive layer 306 engaging the conductive layer 304, a conductive layer 308 engaging the emissive layer 306, and a cathode layer 310 engaging the conductive layer 308. Each of the conductive layers 304 and 308, as well as the emissive layer 306, may be provided using organic molecule or polymer based materials known in the art. The anode layer 302 and cathode layer 310 may be provided using Indium-Tin-Exide (ITO) materials, Indium-Gallium-Zinc-Oxide (IGZO) materials, Indium-Zinc-Oxide (IZO) materials, Silver materials, and/or a variety of other materials known in the art. As discussed in further detail below, the layers 302-310 of the display layer 300 allow the display layer 300 to be flexed out of the substantially planar orientation illustrated in FIG. 3 and into a plurality of flexed orientations. While a simplified example of a display layer has been provided in FIG. 3, one of skill in the art in possession of the present disclosure will recognize that the display layer 300 may include a variety of other components that allow the display layer 300 to produce images.

Figure 4:
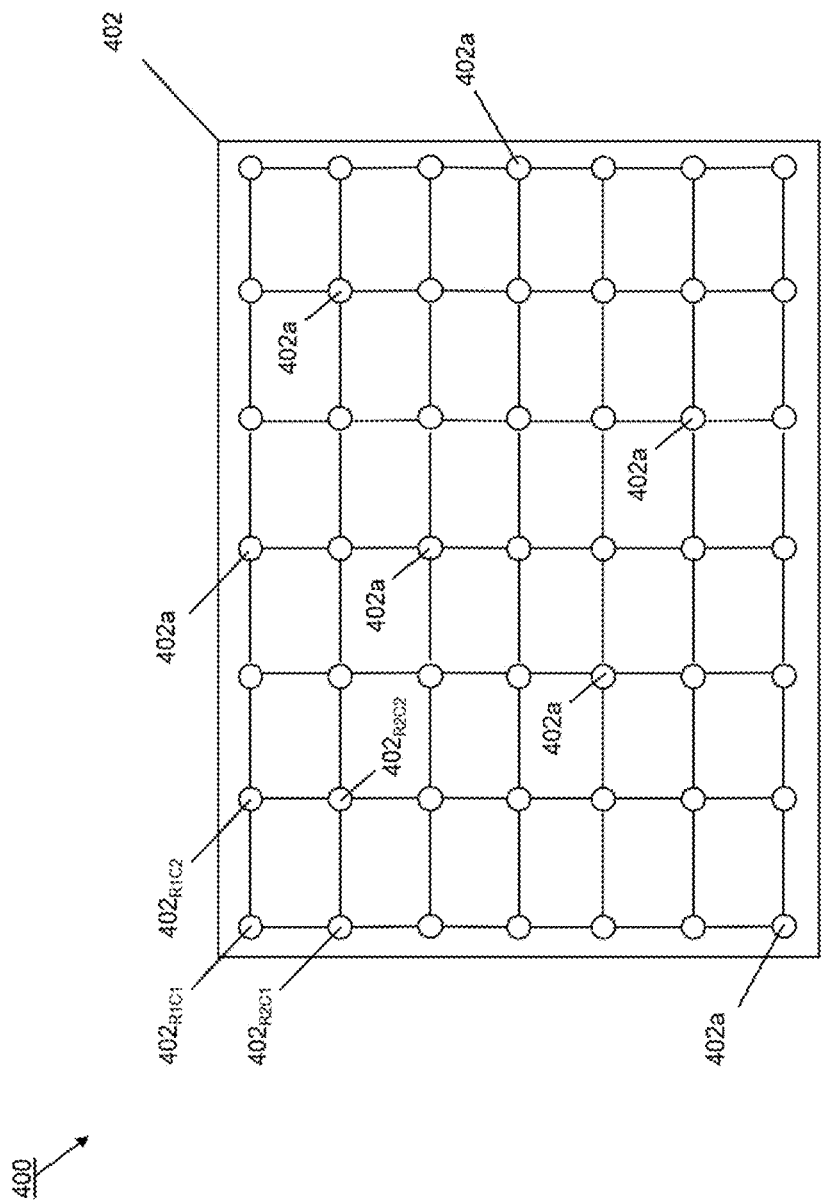
FIG. 4 is a top view of a portion of a sensor layer in the flexible display device monitoring system of FIG. 2

Referring now to FIG. 4, an embodiment of a sensor layer 400 is illustrated that may be the sensor layer 204c discussed above with reference to FIG. 2. In the illustrated embodiment, the sensor layer 400 includes a sensor substrate 402 that may be provided using a variety of materials that allow the sensor layer 400 to be flexed into the plurality of flexed orientations discussed below. The sensor substrate 402 includes a plurality of sensors 402a. In an embodiment, the sensors 402a may be piezo-electric polymer sensors that are configured to generate a voltage in response to experiencing a stress. For example, piezo-electric polymer sensors may be screen printed on carbon fiber, laminated on thermoplastic elastomers, and/or provisioned in a sensor layer in a variety of other manners known in the art. However, the sensors 402 may be a variety of microelectromechanical (MEM) sensors known in the art as well while remaining within the scope of the present disclosure. In the illustrated embodiment, the plurality of sensors 402a are distributed in the sensor substrate 402 in a spaced-apart orientation from each other to provide a sensor matrix that couples the sensors 402a together in a plurality of sensor rows and sensor columns. However, the distribution, orientation, and/or positioning of the sensors 402a relative to each other may differ from that illustrated in FIG. 4 while remaining within the scope of the present disclosure. For example, the sensors 402a may be positioned such that, when the sensors 402a are coupled to the display layer 204b/300, the sensors 402a are positioned adjacent to known high-stress portions of the display layer 204b/300. As such, the symmetrical orientation of the sensors matrix illustrated in FIG. 4 may be modified to a non-symmetrical orientation that optimizes the positioning of the sensors 402 based on known high-stress areas of the display layer 204b/300. While not illustrated, the sensor layer 400 may include a variety of coupling subsystems that are coupled to the sensors 402a or sensor matrix and that are configured to couple to the processing system discussed above with reference to FIG. 2.

In a specific example, with reference to the stress database 208 and stress calculation matrix 208a discussed above with reference to FIG. 2b, the sensors in the sensor substrate 402 may include a sensor $402_{R1C1}$ that is located in a first row and first column of the sensor matrix, a sensor $402_{R1C2}$ that is located in a first row and a second column of the sensor matrix, a sensor $402_{R2C1}$ that is located in a second row and a first column of the sensor matrix, and a sensor $402_{R2C2}$ that is located in a second row and a second column of the sensor matrix. With reference to the stress calculation matrix 208a, the sensor $402_{R1C1}$ may provide stress data for the STRESS DATA ROW 1, STRESS DATA COLUMN 1 entry of the stress calculation matrix 208a, the sensor $402_{R1C2}$ may provide stress data for the STRESS DATA ROW 1, STRESS DATA COLUMN 2 entry of the stress calculation matrix 208a, the sensor $402_{R2C1}$ may provide stress data for the STRESS DATA ROW 2, STRESS DATA COLUMN 1 entry of the stress calculation matrix 208a, and the sensor $402_{R2C2}$ may provide stress data for the STRESS DATA ROW 2, STRESS DATA COLUMN 2 entry of the stress calculation matrix 208a. In addition, one of skill in the art in possession of the present disclosure will recognize how other of the sensors 402a in the stress matrix may provide stress data for entries in the STRESS DATA ROW N, STRESS DATA COLUMN N entries in the stress calculation matrix.

Figure 5:
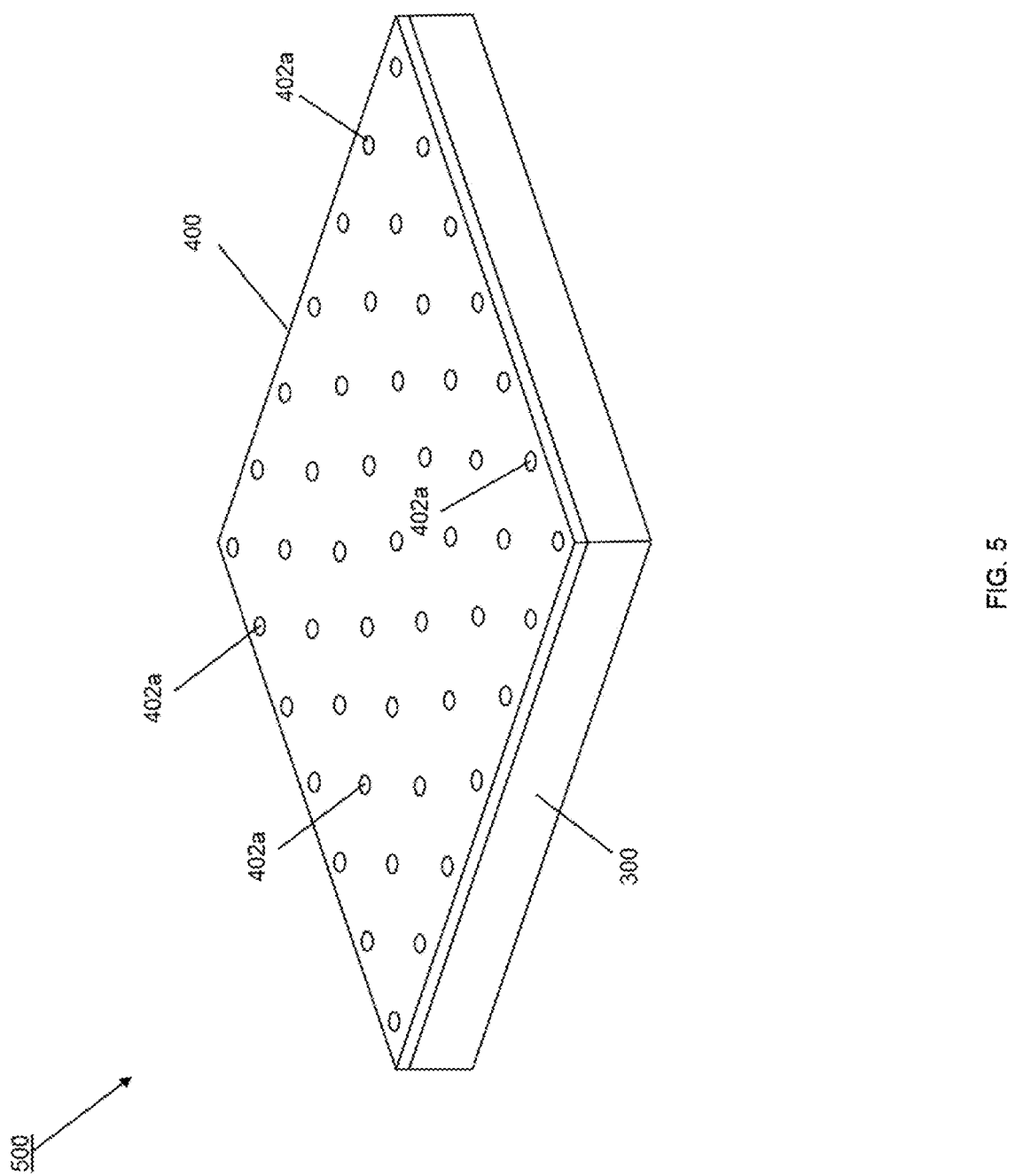
FIG. 5 is a perspective view of a portion of the sensor layer of FIG. 4 coupled to the display layer of FIG. 3 in the flexible display device monitoring system of FIG. 2

Referring now to FIG. 5, an embodiment of a display/sensor layer 500 is illustrated. In an embodiment, the display/sensor layer 500 may be provided by coupling the display layer 300 discussed above with reference to FIG. 3 to the sensor layer 400 discussed above with reference to FIG. 4 by, for example, coupling a thin polymer laminate sensor layer 400 that includes the sensors to the display layer 300, directly depositing the sensor matrix on one of the layers in the display layer 300, and/or using a variety of other coupling techniques known in the art. As would be understood by one of skill in the art, in some situations flexible display layer manufacturers may fabricate the display layer 300 discussed above with reference to FIG. 3, while a flexible display device manufacturer or sensor layer manufacturer may fabricate the sensor layer 400 discussed above with reference to FIG. 4. As such, the flexible display device manufacturer may couple the sensor layer 400 to the display layer 300 to provide the display/sensor layer 500 illustrated in FIG. 5. However, in other embodiments, the sensor layer 400 may be integrated with the display layer 300 by a display layer manufacturer (e.g., as an additional layer to the layers 302-310 illustrated in FIG. 3, by adding the sensors 402a to the display layer, etc.) while remaining within the scope of the present disclosure.

Figure 6:
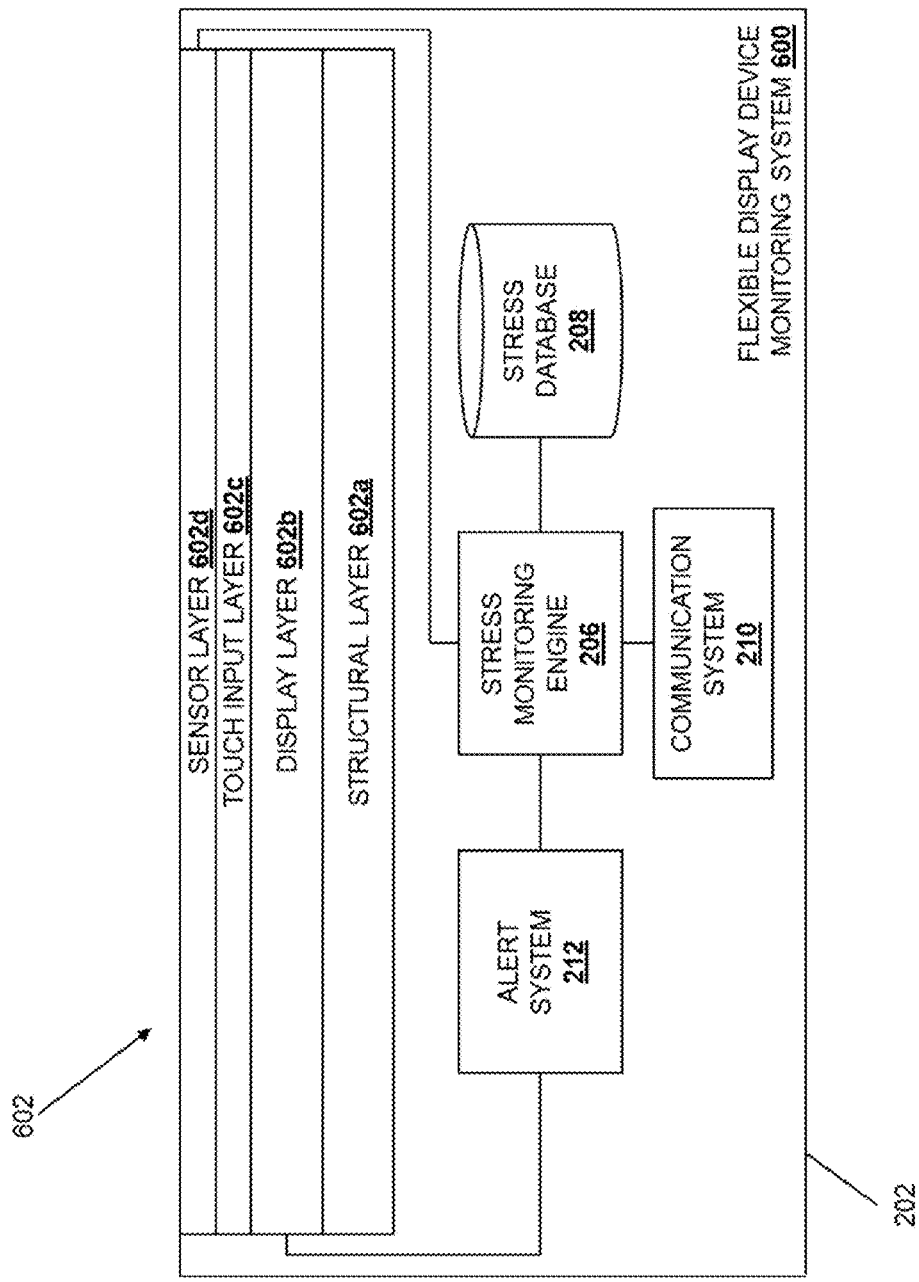
FIG. 6 is a schematic view illustrating an alternate embodiment of a flexible display device monitoring system.
Figure 7:
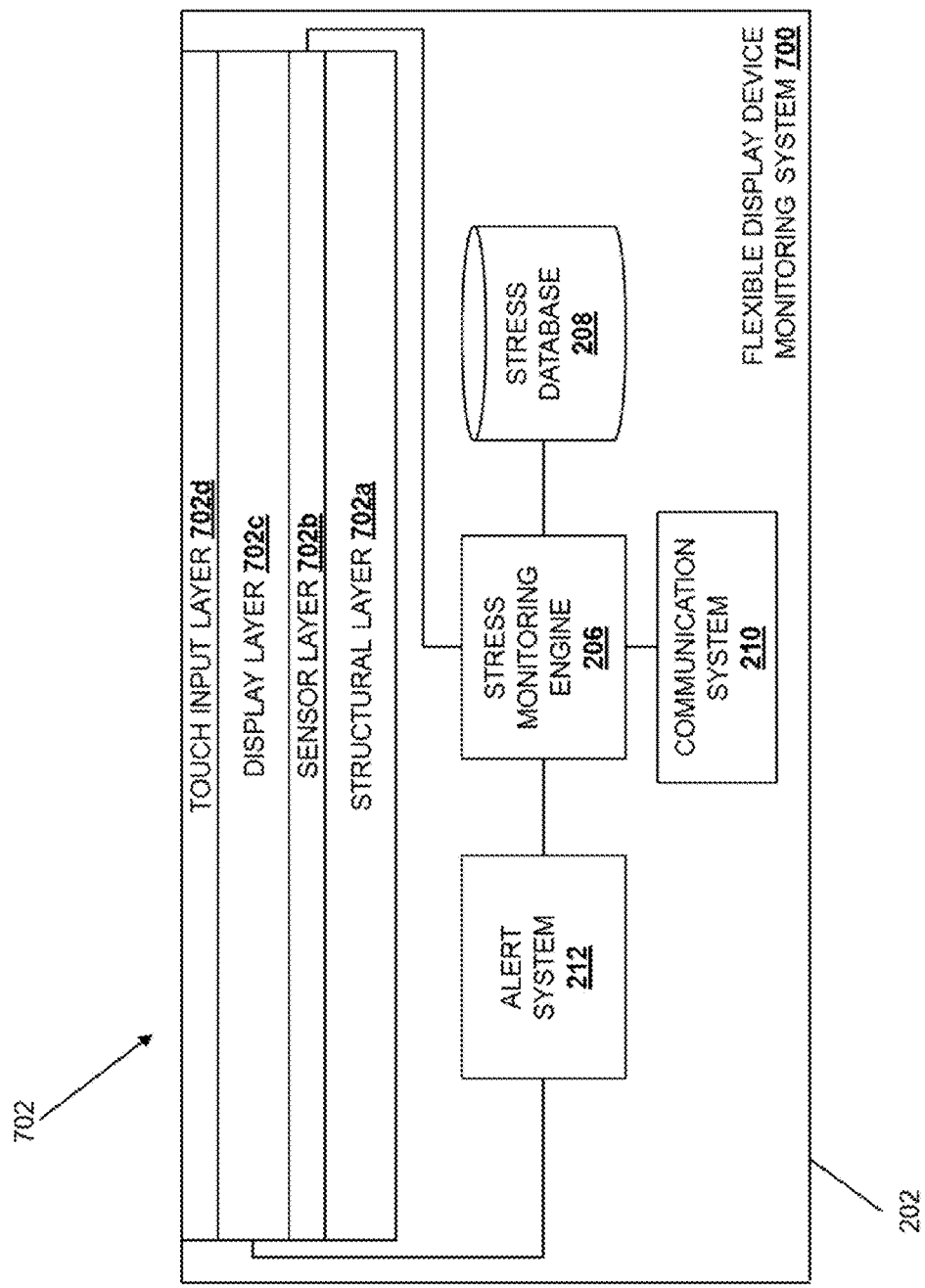
FIG. 7 is a schematic view illustrating an alternate embodiment of a flexible display device monitoring system

Referring now to FIGS. 6 and 7, alternative embodiments of flexible display device monitoring systems are illustrated that are substantially similar to the flexible display device monitoring system of FIG. 2, but with the provision of different display devices. As such, similar components are given similar reference numbers. The flexible display device monitoring system 600 includes a display device 602 with a structural layer 602a, a display layer 602b, a touch input layer 602c, and a sensor layer 602d. In the embodiment illustrated in FIG. 6, the display layer 602b engages the structural layer 602a, the touch input layer 602c engages the display layer 602b, and the sensor layer 602d engages the touch input layer 602c. As such, the flexible display device monitoring system 600 illustrates a display device 602 with the sensor layer 602d located on an opposite side of the touch input layer 602c (i.e., "on top" of the touch input layer 602c) compared the sensor layer 204c and touch input layer 204d in the display device 204 of the flexible display device monitoring system 200 of FIG. 2. Such an embodiment may be enabled by a transparent sensor substrate and sensors fabricated from poly(3, 4-ethylenedioxythiophene):polystyrenesulfonate (PEDOT:PSS) and/or a variety of other transparent substrate and sensor materials known in the art. The flexible display device monitoring system 700 includes a display device 702 with a structural layer 702a, a sensor layer 702b, a display layer 702c, and a touch input layer 702d. In the embodiment illustrated in FIG. 7, the sensor layer 702b engages the structural layer 702a, the display layer 702c engages the sensor layer 702b, and the touch input layer 702d engages the display layer 702c. As such, the flexible display device monitoring system 700 illustrates a display device 702 with the sensor layer 602d located on an opposite side of the display layer 702c (i.e., "under" the display layer 702c) compared the sensor layer 204c and display layer 204b in the display device 204 of the flexible display device monitoring system 200 of FIG. 2.

Referring now to FIG. 8, an embodiment of a method 800 for monitoring a flexible display device is illustrated. In the embodiments discussed below, the display device in the flexible display device monitoring system is discussed as being "flexed" from an "unflexed" orientation in which the display layer in the display device has no outside forces acting on it and may not be subject to stresses, to a "flexed" orientation in which the display layer in the display device has outside forces acting on it that "flex" the display layer to change the shape of the display layer such that it is subject to stresses. However, the display device may be "bent" and "unbent", "folded" and "unfolded", and/or otherwise deformed from a rest state during the method 800 in order to realize the functionality of the flexible display device monitoring system discussed below. The method 800 begins at optional block 802 where the display layer is provided in an unflexed orientation. In embodiment, block 802 of the method 800 is optional in that, in some iterations of the method 800, block 802 may be skipped. For example, the display layer may be moved from a first flexed orientation to a second flexed orientation without being returned to the unflexed orientation, as discussed in further detail below.

Referring now to FIGS. 9a and 9b, an embodiment of a flexible display device monitoring system 900 is illustrated in an unflexed orientation. The flexible display device monitoring system 900 may be any of the flexible display device monitoring systems discussed above, and is discussed below as including the components of the flexible display device monitoring system 200 of FIG. 2. In the embodiment of FIGS. 9a and 9b, the flexible display device monitoring system 900 is illustrated as a tablet computer with a chassis 902 that houses a display device 904. The chassis 902 includes a plurality of chassis features that are illustrated as a hinge 906a and structural features 906b (indicated by the dashed lines) that are configured to allow the chassis 902 to be folded in half, discussed in further detail below. As such, chassis stop features 908 are provided on an edge of the chassis 902 adjacent a perimeter of the display device 904 and are configured to engage another portion of the chassis 902 that is located adjacent the perimeter of the display device 904 on an opposite side of the display device 904, discussed in further detail below. While a specific type of flexible display device monitoring system 900 is illustrated and described below, one of skill in the art in possession of the present disclosure will recognize that display systems other than tablet computer will fall within the scope of the present disclosure and may include mobile phones, televisions, and/or other display systems known in the art.

The unflexed orientation of the flexible display device monitoring system 900 in FIGS. 9a and 9b provides the tablet computer in an unflexed, unbent, and unfolded orientation that includes the display device 904 with a substantially planar shape. In an embodiment, the planar shape of the display device 904 may be a "rest" shape of display device 904 that may introduce no stresses on the display layer 204b in the display device 904 (or reported by the sensors in the sensor layer 204c), while other "activated" shapes of the display device 904 that move the display device 904 out of the planar shape may require a force to be exerted on the display device 904 and may introduce stresses in the display layer 204b in the display device 904 (and reported by the sensors in the sensor layer 204c). In some examples, the display device 904 may be a flexible display device that can be flexed into curved orientations but not folded in half in the manner detailed below for the display device 904. However, in other embodiments, the display device 904 may include a plurality of rest shapes that are planar and/or non-planar that may not introduce stresses in the display device 904. For example, the display device 904 may be a highly flexible display device that can be folded in half without introducing stresses on the display device 904 (or without introducing any stresses that might damage the display device 904). As such, the flexed orientation(s) that result in the sensor layer 204c generating stress data that exceeds a threshold may differ based on the desired functionality of the flexible display device monitoring system 900 and the associated flexibility provided for the display device 904.

Figure 10:
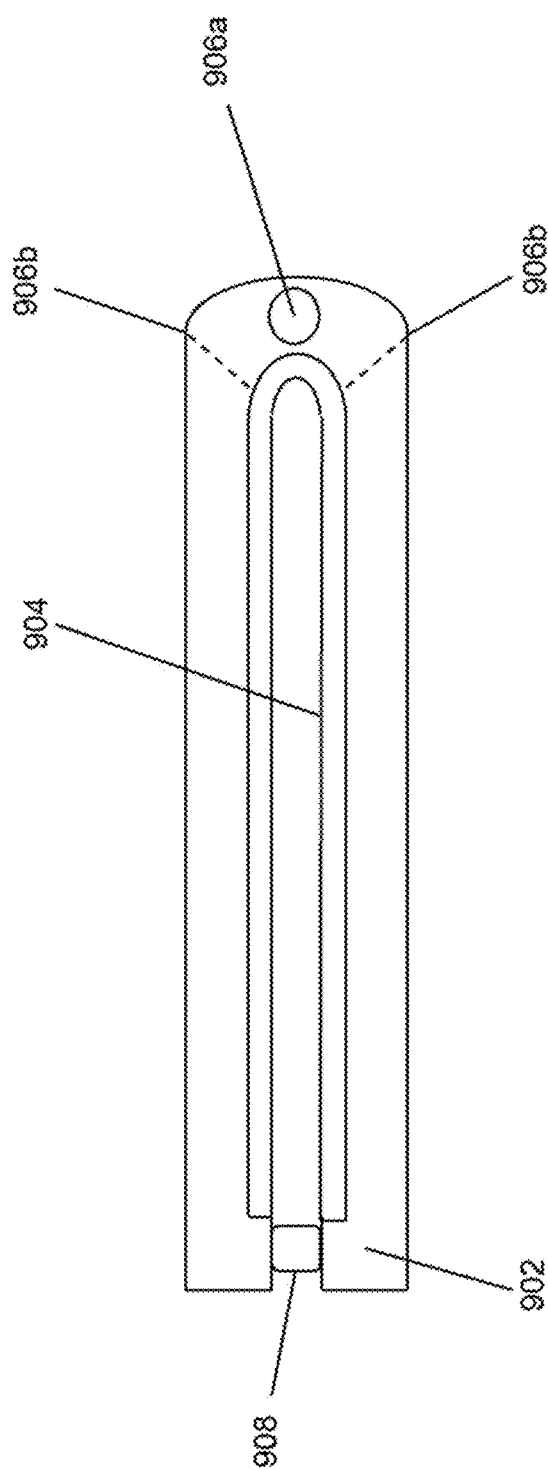
FIG. 10 is a side view illustrating an embodiment of the flexible display device monitoring system of FIGS. 9a and 9b with the display device in a flexed orientation.

The method 800 then proceeds to block 804 where the display layer is flexed into a flexed orientation. Referring now to FIG. 9b, in an embodiment, a user may provide a force on a portion of the chassis 902 on the flexible display device monitoring system 900 such that that portion of the chassis 902 is moved in a direction A about the hinge 906a and the structural features 906b, which results in the display device 904 flexing, bending, and/or folding into the flexed orientation illustrated in FIG. 10. In the specific example illustrated in FIG. 10, the display device 904 is folded in half to reduce the size of the flexible display device monitoring system 900 (i.e., a tablet computer) such that, for example, the flexible display device monitoring system 900 may be stored and/or carried. Referring again to FIG. 9b, in an embodiment, a user may instead provide a force on a portion of the chassis 902 on the flexible display device monitoring system 900 such that that portion of the chassis 902 is moved in a direction B, which results in the display device 904 flexing, bending, and/or otherwise distorting towards or into a flexed orientation for which the flexible display device monitoring system 900 and/or the display device 904 are not designed In the specific example, the user may mistakenly move the portion of the chassis in the direction B (e.g., in an attempt to fold the display device 904 in half as would occur if that portion of the chassis 902 were moved in the direction A) such that the display device 904 begins to experience stresses as a result of being flexed into a flexed orientation for which it is not designed, as a result of the display device 904 being constrained by the chassis 902, and/or for any other reason that may cause stresses in the display layer to exceed the stress thresholds discussed below.

As discussed in further detail below and as would be understood by one of skill in the art, forces may be provided on a variety of different types of display devices to flex, bend, fold, or otherwise distort those display devices into any of a variety of flexed orientations that will fall within the scope of the present disclosure. For example, display devices may be flexed at a corner, along an edge, and/or at any other location on the display device. Furthermore, flexible display devices may be rolled into a "cylinder", flexed to allow them to be mounted in a chassis, and/or otherwise manipulated to conform to a desired shape. Further still, as is discussed and illustrated with the display device 904, a display device may be constrained by a chassis or other structural features such that the display device experiences stresses due to the manipulation of that chassis. As such, compressive stresses, tensile stresses, and/or any of a variety of other stresses that may be introduced in a display device upon flexing of the display device are envisioned as falling within the scope of the present disclosure.

The method 800 then proceeds to block 806 where stress data is generated by the sensors in the stress layer. In an embodiment, in response to the flexing of the display layer in the display device 904 into the flexed orientation, the sensor layer will flex into the same (or substantially the same) flexed orientation such that the sensors in the stress layer experience the stress that is introduced in the corresponding location of the display layer in response to the flexing. For example, with reference to FIG. 5, when the display layer 300 is flexed into a flexed orientation, the sensor layer 400 will also flex into that flexed orientation, and each of the sensors 402a will experience a stress that corresponds to a location of the display layer 300 that is adjacent that sensor 402a (e.g., the corresponding location on the display layer 300 that is immediately "below" the sensors 402a as illustrated in FIG. 5.) In response to experiencing the stress, each of the sensors 402a will generate stress data that is received at the stress monitoring engine 206. In a specific example, the sensors 402a are piezoelectric polymers that generate a voltage upon experiencing the stress, and the stress monitoring engine 208 monitors each sensor 402a for those voltages. However, a variety of other methods for detecting and determining the stress data from different types of sensors is envisioned as falling within the scope of the present disclosure.

Referring now to FIGS. 5 and 11a, an embodiment of a stress data generated in response to flexing the display device into a flexed orientation is illustrated. FIG. 11a illustrates the stress database 208 with the stress calculation matrix 208a populated with a variety of stress data, row and column summation data, and row and column thresholds. In an embodiment, the row and column thresholds may be determined by a display device manufacturer and/or a flexible display device monitoring system manufacturer and provided in the stress database 208. While not illustrated, as discussed above, thresholds may be provided for each entry in the stress data portion of the stress calculation matrix 208a (e.g., a threshold may be associated with stress data generated by each sensor in the sensor layer). In some examples, the systems and methods of the present disclosure may be used to determine each of the thresholds utilized in the stress database 208 by, for example, providing the stress layer in the display device, performing testing on the display device to flex the display device to failure, and recording the stresses experienced by the display layer of the display device in reaching that failure. However, the thresholds may be determined and provided in the stress database 208 in a variety of other manners that will fall within the scope of the present disclosure. The individual entry thresholds, as well as the row thresholds and column thresholds, may be determined such that they provide some warning of impending damage to the display layer (e.g., failure of the display layer, delamination of the display layer from other layers in the display device, etc.) prior to that damage occurring. As such, stress data that reaches or just exceeds the thresholds may be indicative of an upper level of stress that the display layer and/or display device can withstand without damage.

At block 806, the stress data generated by the sensors in the sensor layer may be populated into the entries in the stress data rows and columns, and be used to determine the entries in the row and column summations. For example, in the illustrated embodiment with reference to the sensor layer 400, the sensor $402_{R1C1}$ has provided stress data for the STRESS DATA ROW 1, STRESS DATA COLUMN 1 entry of "0.2", the sensor $402_{R1C2}$ has provided stress data for the STRESS DATA ROW 1, STRESS DATA COLUMN 2 entry of "0.7", the sensor $402_{R2C1}$ has provided stress data for the STRESS DATA ROW 2, STRESS DATA COLUMN 1 entry of "0.3", and the sensor $402_{R2C2}$ has provided stress data for the STRESS DATA ROW 2, STRESS DATA COLUMN 2 entry of "0.8". One of skill in the art will recognize how other sensors 402a in the sensor matrix may provide stress data for the STRESS DATA ROW N, STRESS DATA COLUMN N entries, how each of the entries in the stress data rows may be summed to provide the row summations in the ROW SUM entries, and how each of the entries in the stress data columns may be summed to provide the column summations in the COLUMN SUM entries. While the stress data entries have been normalized such that they are unitless, one of skill in the art will recognize that any stress units may be used in the stress calculation matrix 208a while remaining within the scope of the present disclosure.

Referring now to FIGS. 5 and 12a, an embodiment of a stress data generated in response to flexing the display device into a flexed orientation is illustrated. FIG. 12a illustrates the stress database 208 with the stress calculation matrix 208a populated with a variety of stress data, row and column summation data, and row and column thresholds. In an embodiment, the row and column thresholds as well as the individual entry thresholds are the same as, and thus may have been determined similarly too, the thresholds discussed above with reference to FIG. 11a. However, in the illustrated embodiment with reference to the sensor layer 400, the sensor $402_{R1C1}$ has provided stress data for the STRESS DATA ROW 1, STRESS DATA COLUMN 1 entry of "0.8", the sensor $402_{R1C2}$ has provided stress data for the STRESS DATA ROW 1, STRESS DATA COLUMN 2 entry of "0.7", the sensor $402_{R2C1}$ has provided stress data for the STRESS DATA ROW 2, STRESS DATA COLUMN 1 entry of "0.7", and the sensor $402_{R2C2}$ has provided stress data for the STRESS DATA ROW 2, STRESS DATA COLUMN 2 entry of "0.8". One of skill in the art will recognize how other sensors 402a in the sensor matrix may provide stress data for the STRESS DATA ROW N, STRESS DATA COLUMN N entries, how each of the entries in the stress data rows may be summed to provide the row summations in the ROW SUM entries, and how each of the entries in the stress data columns may be summed to provide the column summations in the COLUMN SUM entries.

The method 800 then proceeds to decision block 808 where it is determined whether the stress data exceeds one or more stress thresholds. In an embodiment, the stress monitoring engine 208 determines whether any of the stress data, by itself and/or in combination with other stress data, exceeds one or more stress thresholds. With reference to the embodiments illustrated in FIGS. 11a and 12a, the stress monitoring engine 208 may compare the stress data provided in each of entries in the stress data row and stress data column portion of the stress calculation matrix 208a with stress thresholds associated with those entries to determine whether received stress data has exceeded a stress threshold. In an embodiment, the stress monitoring engine 208 may compare each of the row summations and column summations with the corresponding row stress thresholds and column stress thresholds to determine whether a summation of the received stress data along a row or column has exceeded a stress threshold. In an embodiment, different stresses (e.g., compressive stresses, tensile stresses, etc.) may be associated with different thresholds that may result in different types of damage to the display layer (e.g., over-flex damage, delamination, etc.), and those each of those thresholds may be considered at decision block 808 as well.

While individual stress data entries and summations of stress data entries along rows and columns are illustrated and described herein as being compared to thresholds, any other comparison of the stress data to stress thresholds (e.g., entries along a diagonal of the stress calculation database, entries corresponding to a particular portion of the display layer such as multiple entries corresponding to a corner of the display layer, etc.) is envisioned as falling within the scope of the present disclosure. One of skill in the art in possession of the present disclosure will recognize that different sizes, shapes, and types of display devices may have particular areas of concern with regard to flexing and resulting stresses, and that stress thresholds (corresponding to any number of associated sensors) may be defined to monitor those areas as desired. Furthermore, stress thresholds may be adjusted as the display layer ages in order to compensate for possible weakening of the display layer over time and/or in response to a history of use.

Figure 11B:
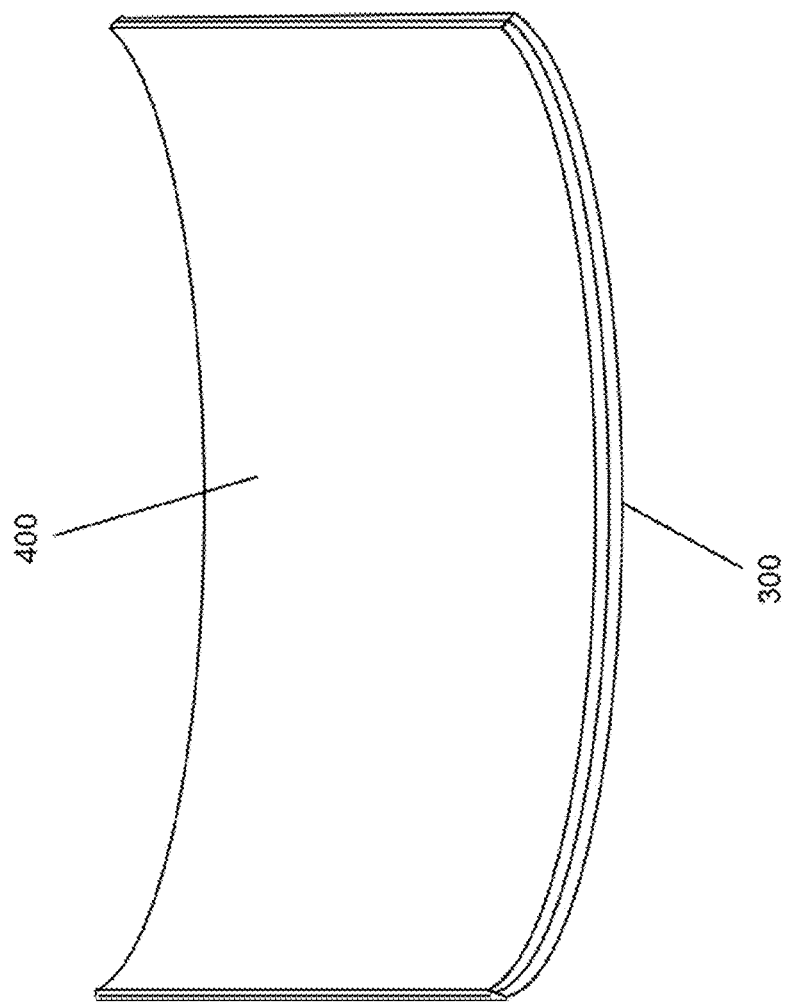

If at decision block 808, it is determined that the stress data does not exceed any stress thresholds, the method 800 then proceeds to block 810 where the stress data is stored. Referring to FIGS. 11a and 11b, an embodiment of the display layer 300 and sensor layer 400 being flexed into a flexed orientation that causes the sensors in the sensor layer 400 to generate stress data that does not exceed any stress thresholds is illustrated. In a specific example, the embodiment illustrated in FIG. 11b may provide a portion of the display device 904 of the flexible display device monitoring system 900 that is adjacent the hinge 906a and that is configured to flex, bend, or fold along with movement of the portion of the chassis 902 in the direction A illustrated in FIG. 9b such that no stresses are introduced in the display layer that exceed any stress thresholds. As such, the sensors in the sensor layer 300 may generate the stress data illustrated in FIG. 11a, which does not exceed any of the individual thresholds for the entries in the stress data rows and columns, and for which the entries in the row summations and column summations do not exceed the thresholds in the corresponding row thresholds and column thresholds. As such, the method 800 may proceed to block 810 where the stress data generated at block 806 is stored. In an embodiment, the stress monitoring engine 206 may store the stress data generated at block 806 in the stress database 208 as historical data of flexed orientation stress data. In some examples, that historical stress data may be used to monitor the fatigue in the display layer over time and use, and may be used to adjust the stress thresholds to account for such time and use. In some embodiments, the flexible display device monitoring system 200 may be a slave device that transmits stress data to a master device that logs and stores that data for analysis, and at block 810 the flexible display device monitoring system 200 may transmit the stress data to the master device. The method 800 may then return to optional block 802 where the display layer is again provided in the unflexed orientation, and/or to block 804 where the display layer is flexed into a different flexed orientation.

Figure 12B:
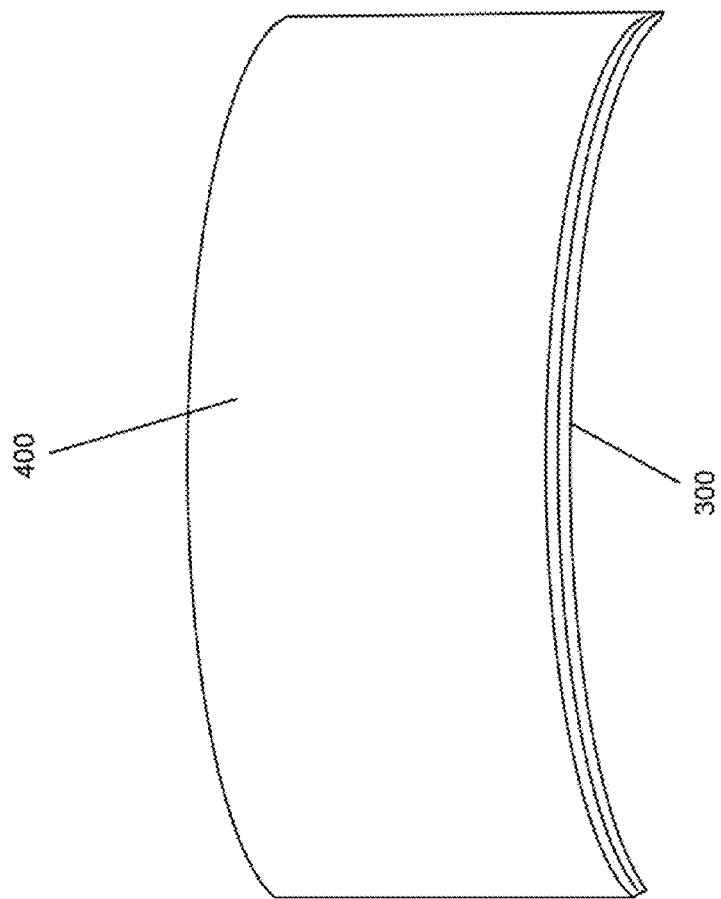

If at decision block 808, it is determined that the stress data exceeds one or more stress thresholds, the method 800 then proceeds to block 812 where an alert system is activated. Referring to FIGS. 12a and 12b, an embodiment of the display layer 300 and sensor layer 400 being flexed into a flexed orientation that causes the sensors in the sensor layer 400 to generate stress data that exceeds one or more stress thresholds is illustrated. In a specific example, the embodiment illustrated in FIG. 12b may provide a portion of the display device 904 of the flexible display device monitoring system 900 that is flexed, bent, or otherwise distorted when the portion of the chassis 902 is moved in the direction B illustrated in FIG. 9b such that stresses are introduced in the display layer that exceed one or more stress thresholds. As such, the sensors in the sensor layer 300 may generate the stress data illustrated in FIG. 12a, which may exceed one or more of the individual thresholds for the entries in the stress data rows and columns, and for which the entries in the row summations and column summations exceed some of the thresholds in the corresponding row thresholds and column thresholds, as illustrated.

Figure 13:
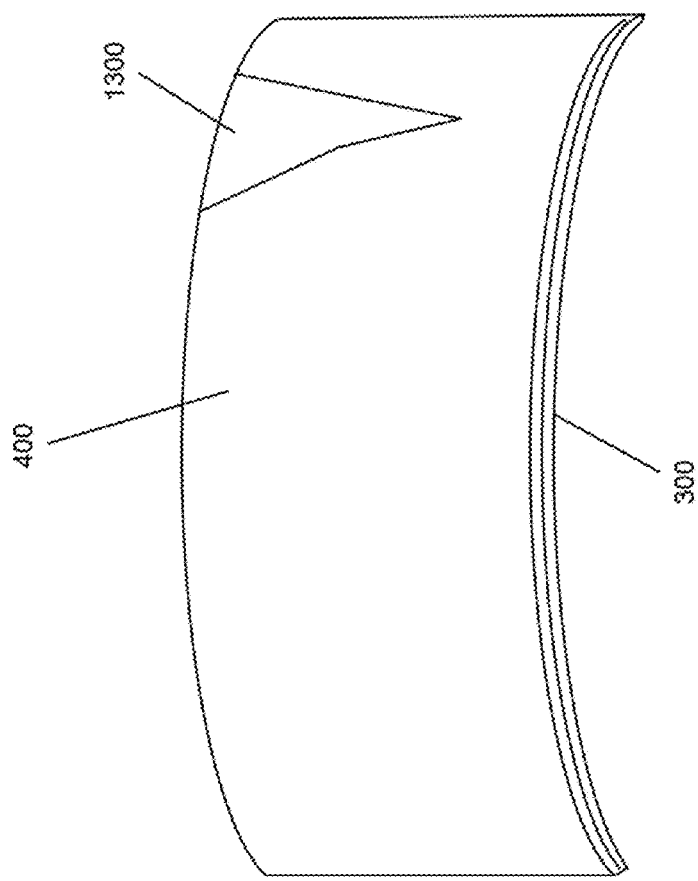
FIG. 13 is a perspective view illustrating an embodiment of a display layer in the display device being used to provide a visual alert.

In response to stress data exceeding one or more stress thresholds, the stress monitoring engine 206 may activate the alert system 212 to provide one or more alerts at block 812. In an embodiment, the activation of the alert system 212 may provide for a visual alert. For example, as illustrated in FIG. 2a, the alert system 212 may be coupled to the display layer 204b, and activation of the alert system 212 may provide a visual alert through the display device 204 such as a flashing display, a text alert, a displayed warning icon, and/or a variety of other visual alerts known in the art. In a specific embodiment, the visual alert provided using the display device 904 may correspond to the relative locations of the sensors 402a in the sensor layer 204c that provided the stress data that exceeded the stress threshold(s). For example, FIG. 13 illustrates the display layer 300 being used to provide a visual alert by illuminating a portion or area 1300 of the display layer 300 that corresponds to sensors in the sensor layer 400 that provided the sensor data that exceeded the stress thresholds and that are located adjacent the area 1300 of the display layer 300 (i.e., "above" the area 1300 in the display layer 300). As such, the display layer 300 may be illuminated, flashed, and/or otherwise used to indicate the actual portion of or area on the display layer 300 that is experiencing stresses that exceed stress thresholds such that a user is informed of the portion or area of the display layer 300 that is currently over-stressed. In an embodiment, the visual alert may continue until the sensors in the sensor layer are no longer generating stress data that exceeds the stress threshold(s). In other example, other devices such as Light Emitting Devices (LEDs) may be activated as part of the alert system 212 to provide the visual alert.

In another embodiment, the alert system 212 may include a vibration producing device, and the activation of the alert system 212 may include activating an actuator that causes the vibration producing device to provide a vibration alert. As such, the flexible display device monitoring system 900 may inform a user that the display layer has been over-stressed by producing a vibration. For example, the vibration alert may include a vibration pattern specific to over-stressing of the display layer, and the vibration may continue until the sensors in the sensor layer are no longer generating stress data that exceeds the stress threshold(s). In another embodiment, the alert system 212 may include an audio speaker, and the activation of the alert system 212 may include driving the audio speaker to provide a sound alert. As such, the flexible display device monitoring system 900 may inform a user that the display layer has been over-stressed by producing sound(s). For example, the sound alert may include a sounds to alert the user of the over-stressing of the display layer (a voice alert, high pitched sounds, etc.), and the sounds may continue until the sensors in the sensor layer are no longer generating stress data that exceeds the stress threshold(s).

While several examples have been provided above, one of skill in the art in possession of the present disclosure will recognize that the alert system 212 may utilize a wide variety of other alert components to provide a variety of alerts known in the art while remaining within the scope of the present disclosure. For example, over-stress alerts for the display layer may different from delamination alerts for the display device (e.g., based on stresses that may cause the display layer to separate from other layers in the display device). Furthermore, one of skill in the art in possession of the present disclosure will recognize that alerts may differ depending on the type of device the flexible display device monitoring system is implemented in. For example, alerts for a television may different from alerts for a tablet computer, which may differ from alerts for a mobile phone.

In some embodiments, the flexible display device monitoring system 200 may include alerting profiles for the alert system 212 that may be based on time, location, and/or other factors known in the art. For example, a time-based alerting profile may define the times during which an alert should be performed, the type of alert that should be performed, and/or a variety of other alerting factors known in the art. As such, a user may instruct the stress monitoring engine 206 to not provide alerts during meetings or other times at which alerts may be inappropriate, or to only provide silent alerts (e.g., visual or vibrational alerts) at such times. Similarly, a location-based alerting profile may define the locations at which an alert should be performed, the type of alert that should be performed, and/or a variety of other alerting factors known in the art. As such, a user may instruct the stress monitoring engine 206 to not provide alerts in theaters or other locations at which alerts may be in appropriate, or to only provide silent alerts (e.g., visual or vibrational alerts) at such locations.

The method 800 may proceed to block 810 where the stress data generated at block 806 is stored. In an embodiment, the stress monitoring engine 206 may store the stress data generated at block 806 in the stress database 208 as historical data of over-flexed orientation stress data, and that historical stress data may be used as discussed above to, for example, adjust the stress thresholds over time and/or as a result of historical use. The method 800 may then return to optional block 802 where the display layer is again provided in the unflexed orientation, and/or to block 804 where the display layer is flexed into a different flexed orientation.

Thus, systems and methods have been described that provide for the detection and monitoring of stresses in a flexible display device, along with the alerting of a user in the event that those stresses exceed one or more stress thresholds. Embodiments of the systems and methods include a plurality of sensors that are distributed over the display layer of a display device and that experience the stresses induced in the display layer in response to flexing of the display layer, which allows for a determination of one or more areas of the display layer that may be over-stressed, along with the alerting of the user about those areas via visual, vibrational, and/or sound alerts. As discussed above, such alerts may be provided in response to stresses along a row and/or column that exceed a threshold for that row or column. As such, a user with a flexible display device may flex that display device as desired, and be warned of possible stresses that may result in damage to the display layer prior to the display layer being flexed such that it experiences those stresses and the resulting damage.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A flexible display device monitoring system, comprising:
   a display layer that is configured to flex into a plurality of flexed orientations;
   a sensor layer that is coupled to the display layer and that is configured to flex with the display layer into the plurality of flexed orientations, wherein the sensor layer includes a plurality of sensors that are positioned in a sensor matrix that distributes the plurality of sensors in a spaced apart orientation across a display area of the display layer, and wherein each of the plurality of sensors is configured to generate stress data in response to the sensor layer being flexed; and
   a stress monitoring engine that is coupled to the sensor layer and that is configured to:
   receive stress data from the plurality of sensors;

determine that the stress data exceeds at least one stress threshold; and activate an alert system in response to the stress data exceeding the at least one stress threshold, wherein the activating the alert system includes activating a relative portion on the display area of the display layer that corresponds with the location of the one or more of the plurality of sensors that provided sensor data that exceeded the at least one stress threshold.

2. The flexible display device monitoring system of claim 1, wherein the sensor layer engages the display layer.

3. The flexible display device monitoring system of claim 1, wherein the sensor layer is spaced apart from the display layer by at least one other layer.

4. The flexible display device monitoring system of claim 1, wherein the activating the alert system includes activating at least one of a vibration alert, a sound alert, and a visual alert.

5. The flexible display device monitoring system of claim 1, wherein the determining that the stress data exceeds the at least one stress threshold includes:

providing the stress data in a stress calculation matrix;

determining at least one cumulative stress calculation that includes a plurality of stress data provided in different entries in the stress calculation matrix; and determining that the at least one cumulative stress calculation exceeds the at least one threshold.

6. An information handling system (IHS), comprising:

a display device that is configured to flex into a plurality of flexed orientations and that includes a plurality of sensors that are provided in a sensor matrix that distributes the plurality of sensors in a spaced apart orientation across a display area of the display device, and that are each configured to generate stress data in response to the display device being flexed;

a processing system that is coupled to the display device; and a memory system that is coupled to the processing system and that includes instructions that, when executed by the processing system, cause the processing system to provide a stress monitoring engine that is configured to:

receive stress data from the plurality of sensors;

determine that the stress data exceeds at least one stress threshold; and activate an alert system in response to the stress data exceeding the at least one stress threshold, wherein the activating the alert system includes activating a relative portion on the display area of the display device that corresponds with the location of the one or more of the plurality of sensors that provided sensor data that exceeded the at least one stress threshold.

7. The IHS of claim 6, wherein the activating the alert system includes activating at least one of a vibration alert, a sound alert, and a visual alert.

8. The IHS of claim 6, wherein the determining that the stress data exceeds the at least one stress threshold includes:

providing the stress data in a stress calculation matrix;

determining at least one cumulative stress calculation that includes a plurality of stress data provided in different entries in the stress calculation matrix; and determining that the at least one cumulative stress calculation exceeds the at least one threshold.

9. The IHS of claim 8, wherein plurality of stress data provided in different entries in the stress calculation matrix includes at least one of stress data provided in a row of the stress calculation matrix and stress data provided in a column of the stress calculation matrix.

10. A method for monitoring a flexible display device, comprising:

flexing, by a display layer, into a flexed orientation;

flexing, by a sensor layer that includes a plurality of sensors that are positioned in the sensor layer in a sensor matrix that distributes the plurality of sensors in a spaced apart orientation across a display area of the display layer, into the flexed orientation in response to the display layer being flexed and, in response, generating stress data by the plurality of sensors, receiving, by a stress monitoring engine from the sensor layer, the stress data;

determining, by the stress monitoring engine, that the stress data exceeds at least one stress threshold; and activating, by the stress monitoring engine, an alert system in response to the stress data exceeding the at least one stress threshold, wherein the activating the alert system includes activating a relative portion on the display area of the display layer that corresponds with the location of the one or more of the plurality of sensors that provided sensor data that exceeded the at least one stress threshold.

11. The method of claim 10, wherein the sensor layer engages the display layer.

12. The method of claim 10, wherein the sensor layer is spaced apart from the display layer by at least one other layer.

13. The method of claim 10, wherein the activating the alert system includes activating at least one of a vibration alert, a sound alert, and a visual alert.

14. The method of claim 10, wherein the determining that the stress data exceeds the at least one stress threshold includes:

providing, by the stress monitoring engine, the stress data in a stress calculation matrix;

determining, by the stress monitoring engine, at least one cumulative stress calculation that includes a plurality of stress data provided in different entries in the stress calculation matrix; and determining, by the stress monitoring engine, that the at least one cumulative stress calculation exceeds the at least one threshold.

* * * * *